United States Patent
Killy et al.

(10) Patent No.: US 9,163,602 B2
(45) Date of Patent: Oct. 20, 2015

(54) SELECTIVE AUTO START/STOP DELAY DURING LOW SPEED MANEUVERS BASED ON ELECTRIC POWER STEERING CURRENT

(71) Applicant: GM Global Technology Operations LLC, Detroit, MI (US)

(72) Inventors: David D. Killy, Toronto (CA); Tom C. Ender, Toronto (CA)

(73) Assignee: GM Global Technology Operations LLC, Detroit, MI (US)

( * ) Notice: Subject to any disclaimer, the term of this patent is extended or adjusted under 35 U.S.C. 154(b) by 42 days.

(21) Appl. No.: 14/086,264

(22) Filed: Nov. 21, 2013

(65) Prior Publication Data

US 2015/0142265 A1    May 21, 2015

(51) Int. Cl.
| | |
|---|---|
| B62D 11/00 | (2006.01) |
| B60Q 1/50 | (2006.01) |
| F02N 11/08 | (2006.01) |
| B62D 5/00 | (2006.01) |
| B60W 10/20 | (2006.01) |
| B60W 10/06 | (2006.01) |

(52) U.S. Cl.
CPC ........... *F02N 11/0833* (2013.01); *B60W 10/06* (2013.01); *B60W 10/20* (2013.01); *B62D 5/00* (2013.01)

(58) Field of Classification Search
CPC ............. G06F 7/00; B60Q 1/50; F02D 28/00; F02D 29/06; F02D 41/021; B60L 11/00; B60L 2240/425; B60W 10/06; B60W 10/20; B60K 6/485; Y02T 10/6226; Y02T 10/6286; Y02T 10/642; B62D 5/00; F02N 11/0833
USPC ........................ 701/22, 34, 102, 112; 340/464
See application file for complete search history.

(56) References Cited

U.S. PATENT DOCUMENTS

2005/0174227 A1 *  8/2005  Bolander et al. ............... 340/464
2009/0024266 A1 *  1/2009  Bertness et al. ................. 701/22

* cited by examiner

*Primary Examiner* — Muhammad Shafi

(57) ABSTRACT

A vehicle includes an electric power steering (EPS) system coupled to a steering wheel of a vehicle. A current sensor senses EPS current drawn by the EPS system. A engine control module controls operation of an engine of the vehicle and includes an auto start/stop module to selective y start and stop the engine independent from user input to start and stop the engine. The auto start/stop module selectively delays an auto engine stop based on the EPS current.

20 Claims, 5 Drawing Sheets

SELECTIVE AUTO START/STOP DELAY DURING LOW SPEED MANEUVERS BASED ON ELECTRIC POWER STEERING CURRENT

FIELD

The present disclosure relates to vehicles including engine controllers and more particularly to engine controllers that auto start/stop an engine.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some automobiles include an engine controller that automatically shuts down and restarts the engine without driver action to reduce the amount of time that the engine spends idling, which reduces fuel consumption and emissions. Typically, the engine controller enables auto start/stop when the vehicle comes to a stop and the brake pedal is depressed. When these conditions are present, the engine controller shuts down the engine without requiring driver action. When the driver releases the brake pedal, the engine controller automatically restarts the engine. During parking maneuvers, however, the engine controller may turn off the engine contrary to the intentions of the driver.

FIG. 1 shows an example of a vehicle 10 including an engine 14. An engine control module 18 controls operation of the engine and includes an auto start/stop module 20 that controls engine auto start/stop. A position of a brake pedal 22 is monitored by a brake pedal sensor 24 and output to the engine control module 18. A position of an accelerator 32 is monitored by an accelerator pedal sensor 34 and output to the engine control module 18. A vehicle speed sensor 38 monitors vehicle speed and outputs the vehicle speed to the engine control module 18. A steering wheel 40 is connected to an electric power steering (EPS) system 42, which reduces steering effort. The EPS system includes a steering angle sensor 46 that senses an angle of the steering wheel 40.

Some manufacturers may use the steering angle sensor that is integrated with the EPS system 42 to identify parking maneuvers and to prevent the auto start/stop system from shutting down the engine during the parking maneuver. In addition to monitoring the brake pedal and vehicle speed, these systems also monitor changes in the angle of the steering wheel to detect the parking maneuver.

SUMMARY

A vehicle includes an electric power steering (EPS) system coupled to a steering wheel of a vehicle. A current sensor senses EPS current drawn by the EPS system. An engine control module controls operation of an engine of the vehicle and includes an auto start/stop module to selectively start and stop the engine independent from user input to start and stop the engine. The auto start/stop module selectively delays an auto engine stop based on the EPS current.

A method includes sensing current drawn by an electric power steering (EPS) system of a vehicle; controlling operation of an engine of the vehicle and selectively starting and stopping the engine independent from user input to start and stop the engine; and selectively delaying an auto engine stop based on the EPS current.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present disclosure relates to an engine control module including an auto-start/stop module that selectively delays shutting down the engine for an auto start/stop based on current drawn by the electric-power-steering (EPS) system. The auto-start/stop module temporarily inhibits the auto start/stop during low speed maneuvers when the auto start/stop would reduce the vehicle's drivability. For example only, the low speed maneuvers may include parking maneuvers or other similar activities. In order to effectively detect suitable low speed maneuvers while maintaining low manufacturing and maintenance costs, the engine control module monitors current drawn by the EPS system and other data such as vehicle speed and brake pedal activity.

The use of a standalone current sensor (as opposed to a steering angle sensor integrated with the EPS system) reduces manufacturing costs and significantly reduces costs associated with repairing or replacing the integrated steering angle sensor. Moreover, inhibiting auto start/stop during parking-like maneuvers improves drivability since the engine would otherwise power-cycle frequently.

By monitoring current draw of the EPS system rather than steering angle, the maintenance and manufacturing costs decrease significantly. The maintenance costs are reduced because the current sensor can be replaced easily. In contrast, the replacement of the steering angle sensor requires replacement of the entire steering rack. Manufacturing costs are reduced because the current sensor is less expensive than integrating the steering angle sensor with the EPS system.

Figure 1:
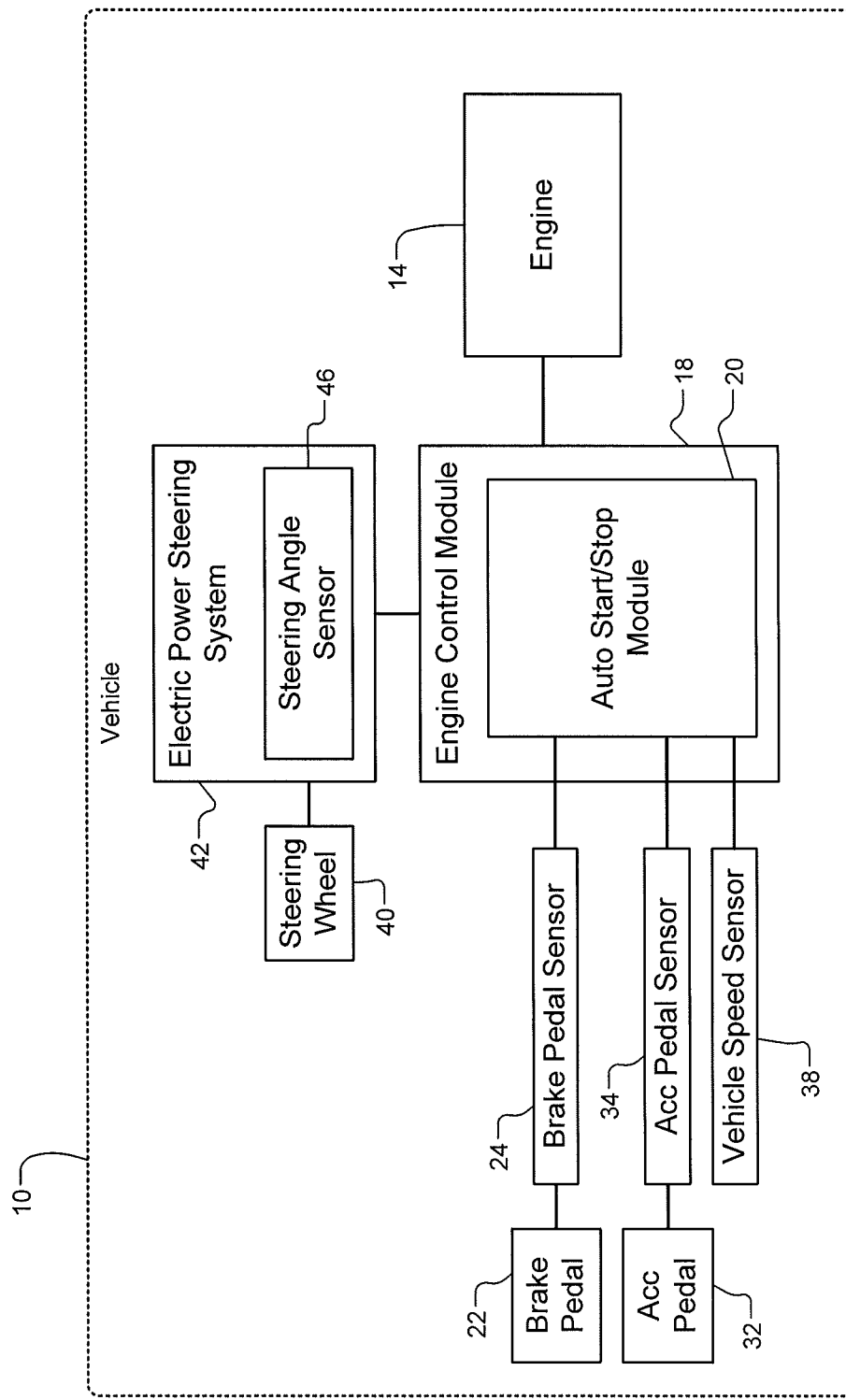
FIG. 1 is a functional block diagram of a vehicle including an electric power steering (EPS) system with an integrated steering angle sensor and an engine control module including an auto start/stop module according to the prior art.
Figure 2:
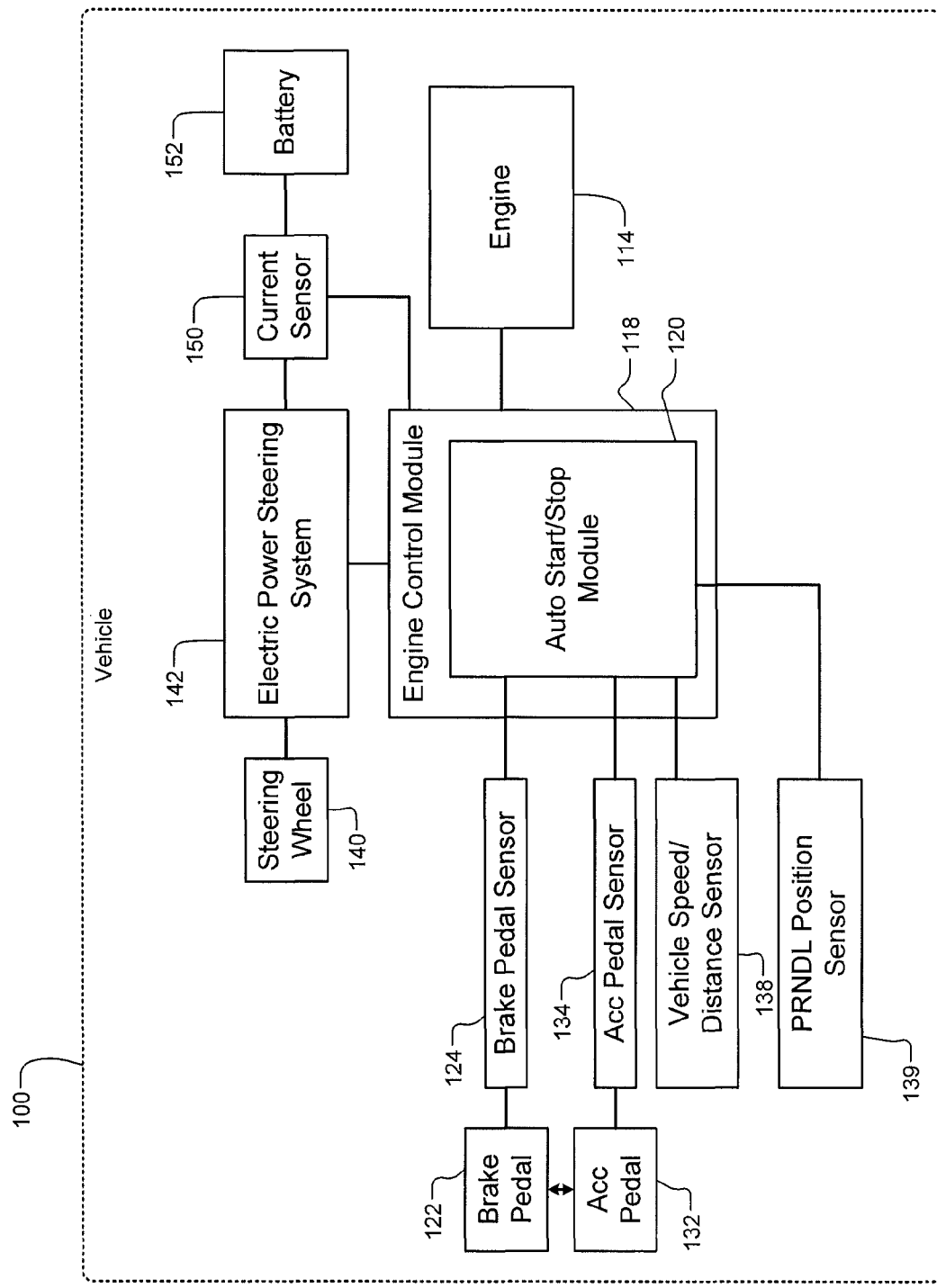
FIG. 2 is a functional block diagram of a vehicle including an electric power steering (EPS) system, a current sensor to sense current drawn by the EPS system and an engine control module including an auto start/stop module according to the present disclosure.

FIG. 2 shows an example of a vehicle 100 including an engine 114. An engine control module 118 controls operation of the engine and includes an auto start/stop module 120 that controls auto start/stop of the engine 114. A position of a brake pedal 122 is monitored by a brake pedal sensor 124 and output to the engine control module 118. A position of an accelerator pedal 132 is monitored by an accelerator pedal sensor 134 and output to the engine control module 118. A vehicle speed/distance sensor 138 monitors vehicle speed and distance travelled and outputs the vehicle speed and distance travelled to the engine control module 118. The vehicle speed/distance sensor 138 may use wheel speed sensors associated with an anti-lock braking system (ABS) (not shown) to sense vehicle speed and distance travelled, although other approaches may be used. A position sensor 139 may directly sense a position of a PRNDL selector or indirectly sense a position of the PRNDL lever via engine speed and vehicle speed and/or using a transmission control module.

A steering wheel 140 is connected to an electric power steering (EPS) system 142, which reduces steering effort. A current sensor 150 senses current drawn from a battery 152 of the vehicle by the EPS system 142. The engine control module 118 monitors the current drawn by the EPS system 142 and selectively disables an auto start/stop based on the EPS current.

Figure 3:
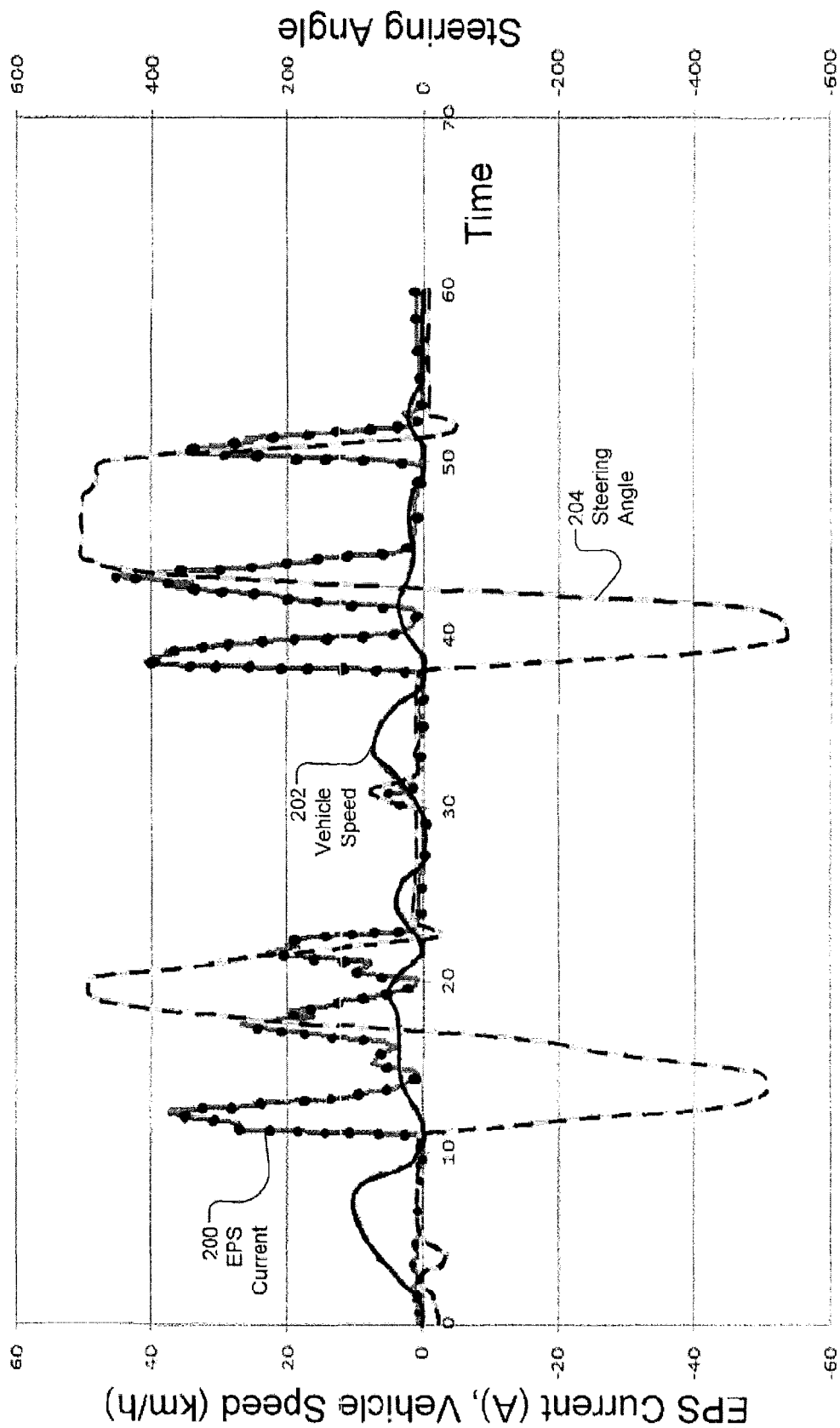
FIG. 3 is a graph illustrating EPS current as a function of time.

FIG. 3 shows EPS current at 200, vehicle speed at 202 and steering angle at 204 as a function of time during a parking maneuver. During a routine stop at a stop light, there is little or no movement of the steering wheel. Therefore, the EPS system will draw little or no current. The driver will use the brakes to stop the car and the vehicle speed will decrease to zero. However, when performing a parking maneuver or a parking-like maneuver, the driver may (1) stop the car, (2) turn the steering wheel and (3) repeat (1) and (2) one or more times.

Figure 4:
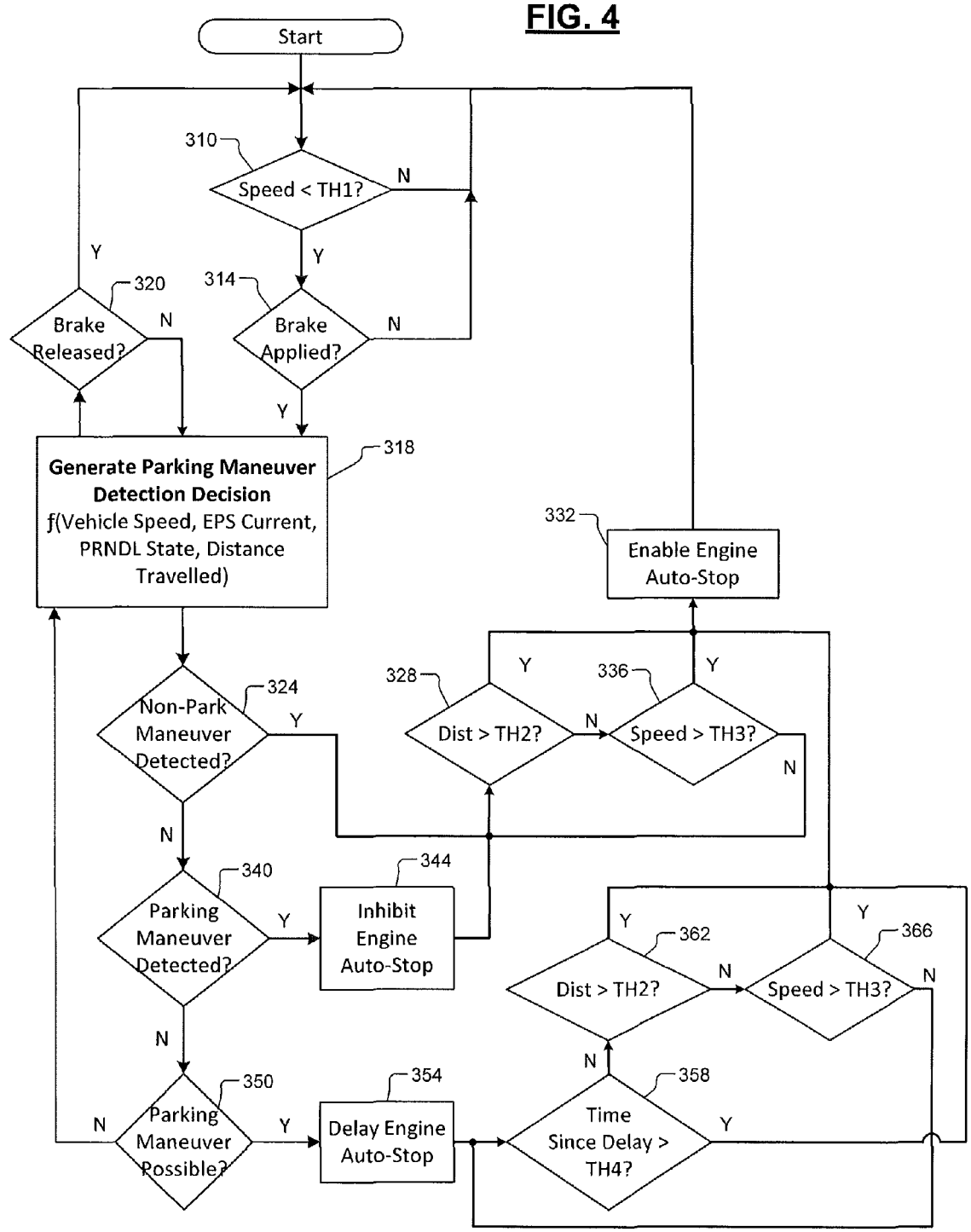
FIG. 4 is an example of a flowchart illustrating a method for operating the auto start/stop module according to the present disclosure.

FIG. 4 shows an example of a method for selectively delaying or inhibiting an engine auto start/stop module of a vehicle based on sensed EPS current. At 310, control compares the vehicle speed to a threshold TH1. If the vehicle speed is greater than or equal to the threshold TH1, control returns to 310. Otherwise control continues with 314 and determines whether the brakes are applied. If 314 is false, control returns to 310. Otherwise, control continues at 318 and generates a parking maneuver detection decision. If the brakes are released at 320, control returns to 310. If a non-parking maneuver is detected at 324, control continues with 328 and determines whether a distance travelled is greater than a threshold TH2. If 328 is false, control continues with 336 and determines whether the speed is greater than a threshold TH3. If 336 is false, control returns to 328. If either 328 or 336 are true, control continues with 332 and enables an engine auto stop.

If 324 is false and a parking maneuver is detected at 340, an engine auto stop is inhibited at 344 and control continues with 328. If 340 is false, control determines whether a parking maneuver is possible at 350. If 350 is true, control delays engine auto stop at 354. At 358, control determines whether a time since the delay is greater than a threshold TH4. If 358 is true, control continues with 332. If 358 is false, control continues with 362 and determines whether a distance travelled is greater than the threshold TH2. If 328 is false, control continues with 336 and determines whether the speed is greater than the threshold TH3. In some examples, the speed thresholds TH1 and TH3 are the same.

Figure 5:
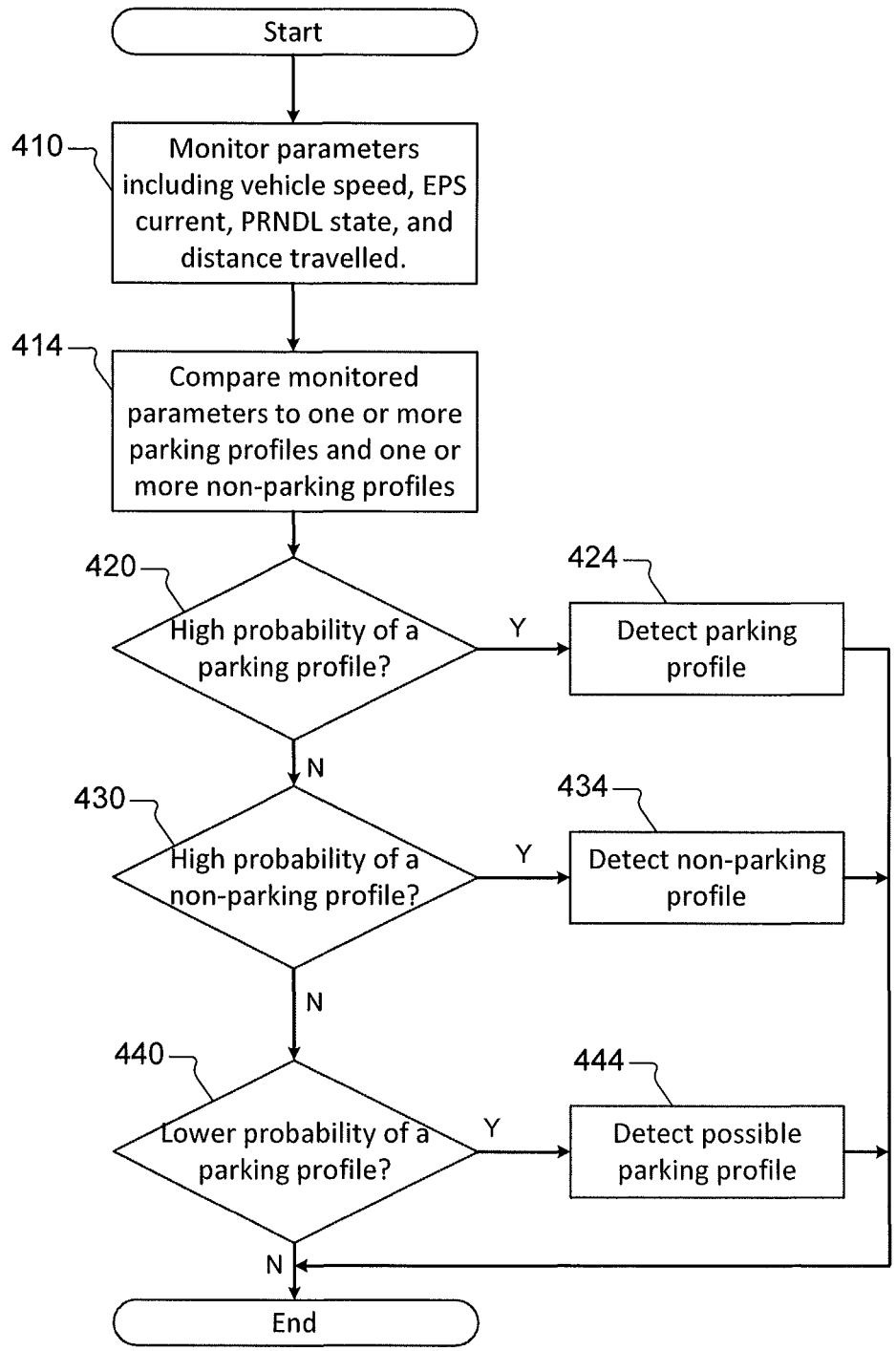
FIG. 5 is an example of a flowchart illustrating a method for detecting a parking maneuver.

FIG. 5 shows an example of a method for generating a parking maneuver detection decision. At 410, control monitors one or more parameters including but not limited to vehicle speed, EPS current, PRNDL state and/or distance travelled. At 414, control compares monitored parameters to one or more parking profiles and/or to one or more non-parking profiles. At 420, control determines whether the monitored parameters have a high probability of being one of the parking profiles. A high probability may be selected if a calculated probability is greater than a first probability threshold or using other criteria (such as A out of B parameters are satisfied). For example only, the parameters may include changes in EPS current, changes in speed, changes in throttle position, etc. A and B are integers and A is less than or equal to B. If 420 is true, control detects a parking profile.

If 420 is false, control determines at 430 whether the monitored parameters have a high probability of being one of the non-parking profiles. A high probability may be selected if a calculated probability is greater than a second probability threshold or using other criteria such as X out of Y parameters are satisfied. X and Y are integers and X is less than or equal to Y. IF 430 is true, control detects a non-parking profile at 434.

If 430 is false, control determines whether there is a lower probability that the monitored parameters correspond to one of the parking profiles at 440. The lower probability may correspond to a third probability threshold that is less than the first probability threshold. If true, control detects a possible parking profile at 444.

Successful detection of parking maneuvers may be accomplished by identifying characteristics particular to a parking maneuver. Examples of parking maneuvers include frontal park, reverse stall park, parallel park, etc. For example, EPS current and changes in the PRNDL position may be used to identify a parallel parking maneuver.

For some examples, differences may lie in the behavior of the approaching vehicle speed. The parking maneuver (as compared to turning a corner) may have a relatively constant and lower speed trace whereas turning the corner would not (provided the EPS current curves are observed correctly). In a corner and stop and go traffic scenario, the approaching frequent of stops/starts may indicate that the car is not in a parking lot. Detection is performed by analyzing the probability that the signals are showing a parking-like maneuver.

There are instances where the EPS current will fall from the current required to hold the steering column at a current position (the motor's "hold current") for a brief moment due to variables such as vehicle inertia, etc. In these instances, the parking detection algorithm remains active and the result may be a possible parking maneuver detected.

In some examples, the EPS current is sensed using the current sensor and the engine control module performs diagnostics on the information. In an alternative example, the current sensor may be a smart current sensor that includes an integrated circuit. The integrated circuit senses current and performs diagnostics on the sensed current. The smart current sensor sends the sensed current and diagnostic information to the engine control module.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory' tangible computer readable medium. The computer programs may also include and/or rely on stored data.

What is claimed is:

1. A vehicle comprising:
    an electric power steering (EPS) system coupled to a steering wheel of a vehicle;
    a current sensor to sense EPS current drawn by the EPS system; and
    an engine control module to control operation of an engine of the vehicle and including:
        an auto start/stop module to selectively start and stop the engine independent from user input to start and stop the engine,
        wherein the auto start/stop module selectively delays an auto engine stop based on the EPS current.

2. The vehicle of claim 1, wherein the current sensor is located between the EPS system and a vehicle battery.

3. The vehicle of claim 1, wherein the current sensor is located independent from the EPS system.

4. The vehicle of claim 1, wherein the auto start/stop module selectively delays the auto engine stop further based on vehicle speed.

5. The vehicle of claim 1, wherein the auto start/stop module selectively delays the auto engine stop further based on a distance travelled by the vehicle after a brake is applied and vehicle speed is less than a predetermined threshold.

6. The vehicle of claim 1, wherein the auto start/stop module selectively delays the auto engine stop further based on brake pedal position.

7. The vehicle of claim 1, wherein the auto start/stop module selectively delays the auto engine stop further based on PRNDL position.

8. The vehicle of claim 1, wherein the auto start/stop module determines whether activity occurring after a brake pedal is applied and vehicle speed is less than a predetermined value corresponds to a parking maneuver, a non-parking maneuver or a possible parking maneuver.

9. The vehicle of claim 8, wherein the auto start/stop module delays engine auto stop when the auto start/stop module determines that the possible parking maneuver has occurred.

10. The vehicle of claim 9, wherein the auto start/stop module enables engine auto stop when at least one of:
    a distance travelled by the vehicle since the brakes are applied is greater than a first threshold;
    a speed of the vehicle is greater than a second threshold; and
    a period since the delay began is greater than a third threshold.

11. A method comprising:
    sensing current drawn by an electric power steering (EPS) system of a vehicle;
    controlling operation of an engine of the vehicle and selectively starting and stopping the engine independent from user input to start and stop the engine; and
    selectively delaying an auto engine stop based on the EPS current.

12. The method of claim 11, wherein the current is sensed between the EPS system and a vehicle battery.

13. The method of claim 11, wherein the current is sensed independent from the EPS system.

14. The method of claim 11, further comprising selectively delaying the auto engine stop further based on vehicle speed.

15. The method of claim 11, further comprising selectively delaying the auto engine stop further based on a distance travelled by the vehicle after a brake is applied and vehicle speed is less than a predetermined threshold.

16. The method of claim 11, further comprising selectively delaying the auto engine stop further based on brake pedal position.

17. The method of claim 11, further comprising selectively delaying the auto engine stop further based on PRNDL position.

18. The method of claim 11, further comprising determining whether activity occurring after a brake pedal is applied and vehicle speed is less than a predetermined value corresponds to a parking maneuver, a non-parking maneuver or a possible parking maneuver.

19. The method of claim 18, further comprising delaying engine auto stop when the auto start/stop module determines that the possible parking maneuver has occurred.

20. The method of claim 19, further comprising enabling engine auto stop when at least one of:
    a distance travelled by the vehicle since the brakes are applied is greater than a first threshold;
    a speed of the vehicle is greater than a second threshold; and
    a period since the delay began is greater than a third threshold.

* * * * *